3,105,826
SURFACE-COATING COMPOSITIONS COMPRISING A POLYEPOXIDE, AN ALKYLATED AMINOPLAST, AND AN ACRYLATE COPOLYMER, AND ARTICLES COATED THEREWITH
La Barre L. Jaggard, Moorestown, N.J., assignor to Rohm & Haas Company, Philadelphia, Pa., a corporation of Delaware
No Drawing. Filed Mar. 20, 1959, Ser. No. 800,625
19 Claims. (Cl. 260—45.2)

This invention is concerned with coating compositions comprising (A) an alkylated aminoplast resin-forming condensate, (B) a thermoplastic polyacrylic ester, and (C) a polyepoxide. It is particularly concerned with coating compositions of thermosetting character which are capable of producing coatings which can be cured by heat and are particularly adapted to be cured in a moist, high-temperature atmosphere under pressure, such as steam. The compositions are, therefore, suitable for use as clear or pigmented finishes for many articles, such as wire and asbestos-cement products. They are useful for transparentizing paper, as fillers or saturants for porous articles, such as metal castings and ceramic articles, and are especially valuable as electrically insulating coatings.

One of the objects of the present invention is to provide a coating composition which can be cured to relatively infusible and/or insoluble condition with or without direct contact with steam without encountering serious degradation or deterioration of the components making up the composition as a result of such direct contact. Another object of the invention is to provide compositions which, by virtue of a content of polar groups in the thermoplastic polyacrylic ester polymer, have improved adhesion toward substrates, and particularly metals, to which it is commonly difficult to adhere a finishing or coating lacquer without the initial application of special priming coats. Another object of the invention is to provide coating compositions which are adapted to be applied to asbestos cement products or other products formed of inorganic cements for the purpose of preventing efflorescence or "bloom." Another object of the invention is to provide compositions for transparentizing paper. Another object of the invention is to provide compositions of solvent-resistant character adapted to fill the pores of metal castings or of unglazed ceramic articles. Another object is to provide compositions useful as electrically insulating coatings or impregnations. Other objects and advantages of the invention will be apparent from the description hereinafter.

In accordance with the present invention, it has been discovered that coating compositions comprising an alkylated aminoplast, a polyepoxide, and a thermoplastic polyacrylic ester, can be satisfactorily cured in a steam atmosphere in direct contact with the steam (at pressures from atmospheric to 100 lbs./sq. in. gage).

The polyacrylic ester may be a poly(methyl methacrylate) homopolymer or a copolymer of an alkyl acrylate or methacrylate of the formula

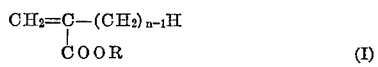

in which $n$ is an integer having a value of 1 to 2, and R is benzyl, cyclohexyl, or an alkyl group having 1 to 10 carbon atoms.

The copolymer may comprise from 1 to 4% by weight of a copolymerizable unsaturated acid, or an alkali metal or ammonium salt thereof, such as maleic acid, fumaric acid, aconitic acid, citraconic acid, crotonic acid; but for most practical purposes acrylic acid, methacrylic acid, or itaconic acid is preferred. The inclusion of the acid in the copolymer is particularly desirable when pigmented compositions are used since it markedly enhances the gloss of coatings obtained from such compositions. The acrylate polymer may be a copolymer containing from 1 to 10% by weight of units of one or more copolymerizable monoethylenically unsaturated compounds having a $H_2C=C<$ group and a polar group for the purpose of improving adhesion to particular substrates, and especially metals, or for improving mutual compatibility between the several components A, B, and C above. Examples of such compounds are:

Ureidoalkyl vinyl ethers, e.g.,
2-ureidoethyl vinyl ether
2,2-dimethyl-2-ureidoethyl vinyl ether
Glycidyl acrylate
Glycidyl methacrylate
Acrylic acid
Methacrylic acid
Itaconic acid
Acrylamide
Methacrylamide
N-alkylacrylamide (alkyl having 1 to 4 carbon atoms)
N-alkylmethacrylamide (alkyl having 1 to 4 carbon atoms)
N-methacrylamidoethyl-N,N'-ethyleneurea
N-($\beta$-($\alpha$-acryloxyacetamido)ethyl)-N,N'-ethyleneurea
N-($\beta$-($\alpha$-methacryloxyacetamido)ethyl)-N,N'-ethyleneurea A preferred group of comonomers are those of neutral character which contain an amido-linkage, that is, either a simple carbonamido type having the characteristic group

or a ureido type characterized by a

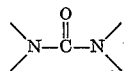

group, both of these types being illustrated by the first three compounds and the last seven in the list just above. The last seven comonomers show the greatest improvement in adhesion, even though they apparently provide no reactive sites capable of reacting with the epoxy groups. They also show good resistance to alkalies and soap.

Other monoethylenically unsaturated compounds copolymerizable with the esters of acrylic acid or methacrylic acid include acrylonitrile or methacrylonitrile, styrene, vinyltoluene, $\alpha$-methyl styrene, and so on. The hardness, flexibility, toughness, and adhesion for various substrates can be varied widely as desired by suitably adjusting the proportions of these various monomers. For example, a copolymer containing 95% of an ester of acrylic acid such as methyl, ethyl, or butyl acrylate with 5% of methyl methacrylate produces films which are extremely flexible and adherent. On the other hand, a copolymer of 95% by weight of methyl methacrylate with 5% by weight of methyl, ethyl, or butyl acrylate produces an extremely hard film, which is suitable for relatively rigid substrates but is insufficiently flexible to be applied to highly flexible substrates such as of leather.

The copolymers may be prepared in any suitable fashion. They should have a molecular weight in the range of about 10,000 to about 130,000 viscosity average and for this purpose solution polymerization, particularly in a solvent which may be employed as the solvent for the coating application, is generally preferred. The monomers comprising the acrylic ester with or without other monoethylenically unsaturated compounds in the proportions described are mixed in the solvent at a concentration of about 10% to 60% total monomer in the entire solution and any suitable free-radical initiator soluble in the solvent is introduced. The initiator may be an azo catalyst, a per-oxygen compound, such as t-butyl peracetate, or a peroxide, such as benzoyl peroxide, or a hydroperoxide, such as t-butyl hydroperoxide, or cumene hydroperoxide. The solution is heated to reflux to effect polymerization and held at reflux for a period of 2 to 6 hours or more. Thereafter, the solution of the polymer may be cooled and the aminoplast solution prepared as described hereinafter may be introduced with adjustment of the solvent content to provide the concentration desired. Pigments, extenders, curing catalysts, and any other adjuvants may then be added.

The alkylated aminoplasts which may be used include those obtained by the alkylation, with cyclohexanol or an alkanol having from 1 to 8 carbon atoms (preferably 4 to 6 carbon atoms), of a condensate of an aldehyde, and especially formaldehyde, with urea, N,N'-ethyleneurea, dicyandiamide, and aminotriazines. Any of these water-insoluble alkylated aminoplast condensates may be employed within the limits of compatibility provided it is soluble in the organic solvent employed in making the coating compositions. In general, the alkylated condensates should have at least 80% and preferably 100% of the methylol groups alkylated with cyclohexanol or an alkanol having 1 to 8 carbon atoms. The butylated products are particularly valuable because of their greater compatibility with a wide range of copolymers, polyepoxide, and solvents mentioned hereinafter.

Among the aminotriazines which are suitable are melamine, acetoguanamine, benzoguanamine, formoguanamine, N-(t-butyl)melamine, N-(t-octyl)melamine in which the t-octyl group has the formula $$-C(CH_3)_2CH_2C(CH_3)_3$$

ammeline, 2-chloro-4,6-diamino-1,3,5-triazine, 2-phenyl-p-oxy-4,6-diamino-1,3,5-triazine, 6-methyl-2,4-diamino-1,3,5-triazine, 2,4,6-trihydrazine-1,3,5-triazine, 2,4,6-triethyl-triamino-1,3,5-triazine, and the N,N-di-(C$_1$-C$_4$)-alkyl melamines such as N,N-dimethylmelamine. While any aldehyde may be employed such as acetaldehyde, crotonaldehyde, and acrolein, the condensates obtained using formaldehyde and revertible polymers thereof such as para-formaldehyde are preferably employed.

To the solution of polymer there is also added a polyepoxide. The polyepoxides contemplated are those which contain at least two epoxy groups in which the oxygen is attached to adjacent carbon atoms connected together in a chain by a single valence bond. These epoxy groups may be termed vic-epoxy groups. The preferred polyepoxides are those which contain a terminal epoxy group of the formula

(II)

These resin-forming polyepoxides may be termed "ethoxyline" resins and are more particularly defined as organic compounds free of functional groups other than hydroxyl and epoxy groups which contain at least two vic-epoxy groups in which the oxygen is attached to adjacent singly-bonded carbon atoms and which have a molecular weight in the range of about 250 to 5,000. The polyepoxides having epoxy equivalencies from 100 to 1025 have generally been found to have satisfactory compatibility with the polymers and aminoplast herein defined. Those having greater epoxy equivalencies up to about 1,500 or higher are not generally compatible but may be used when special care is taken to select components of the polymer and aminoplast resin, as well as the proportions thereof relative to polyepoxide, to provide mutual compatibility.

Polyepoxides that may be used include glycol-bis-exo-dihydrodicyclopentadienyl ethers having the general formula:

$$O'=C_{10}H_{13}-O-R-O-C_{10}H_{13}=O' \quad (III)$$

in which $C_{10}H_{13}$ is the radical of exo-dihydrodicyclopentadiene, the two O' groups are oxygen atoms which together with two adjacent carbon atoms in the $C_{10}H_{13}$ radicals form oxirane rings, and R is either (a) an alkylene group of 2 to 12 carbon atoms or (b) a radical of an etherified polyalkylene glycol, which radical has the formula $(R'-O-)_xR'$ in which $R'$ is an alkylene group of 2 to 4 carbon atoms and $x$ is an integer having a value of 1 to 8 inclusive. These compounds and their production are described in U.S. Patent 2,543,419. There may also be used the "ethoxyline resins" available under the trade names of Epon or Araldite resins. They are polyether derivatives of a polyhydric phenol containing epoxy groups and may be prepared by effecting reaction between a polyhydroxy phenol or alcohol, for example, hydroquinone, resorcinol, glycerine, or condensation products of phenols with ketones, for instance, bis-(4-dihydroxydiphenyl)-2,2-propane, and epichlorohydrin. For example, the reaction of epichlorohydrin with bis-(4-hydroxyphenyl)2,2-propane may be formulated as follows:

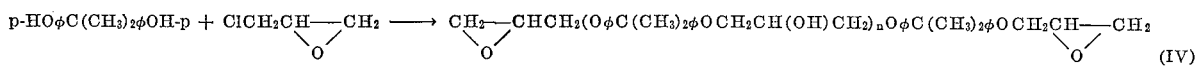

(IV)

where $\phi$ is the phenylene group and $n$ has an average value varying from around zero to about 7. These resins may be made by the method disclosed in 2,324,483, 2,444,333, British Patents 518,057 and 579,698. Data on the Epon resins are given in the table below:

TABLE I

| Epon No. | Epoxide Equivalent | Approximate Esterification Equivalent | M.P., 0° C. |
|---|---|---|---|
| RN-34 | 225–290 | 105 | 20–28 |
| RN-48 | 192 | 80 | 9 |
| 1064 | 300–375 | 105 | 40–45 |
| 1062 | 140–165 | | Liquid |
| 1004 | 905–985 | 175 | 97–103 |
| 1001 | 450–525 | 130 | 64–76 |

Also, there may be used polyepoxides of the formula

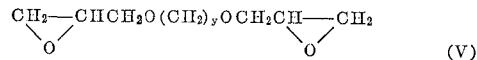

(V)

where $y$ is a number having an average value of 2 to 4. Epon 562 is of this type, is liquid at normal room conditions and has an "Epoxide Equivalent" value of 140–165. Also, a diepoxide or triepoxide of glycerol may be used. These aliphatic polyepoxides may be prepared in the known fashion as described, for example, in United States Patents 2,730,427 and 2,752,269. The preferred polyepoxides are those having average molecular weights of about 250 to 1,000.

Among the curing catalysts that may be used to cure the composition of the present invention are any of the acid catalysts and, included in that group, are the organic and inorganic acid catalysts. One may use, for instance, in catalytic amounts, sulfuric acid, hydrochloric acid, and their acid salts, such as ammonium sulfate, ammonium chloride, or the organic acid, such as acetic acid, phthalic acid, benzoic acid, toluene sulphonic acid, naphthalene sulphonic acid, and the mono-salt of maleic acid with triethylamine.

The proportions of the several binder or film-forming components of the coating composition fall within the following broad and preferred ranges:

|  | Broad, percent by weight | Preferred, percent by weight |
| --- | --- | --- |
| Polyepoxide | 5 to 30 | 10 to 23 |
| Thermoplastic Polymer | 45 to 90 | 65 to 82 |
| Aminoplast | 5 to 25 | 8 to 12 |
| Catalyst | 0.1 to 1.0 | 0.4 to 0.6 |

The limits of the ranges given are, of course, qualified by mutual compatibility within the final coating and the solvent system employed. Thus, a particular polymer may not be compatible, over the full range given, with a particular combination of polyepoxide and aminoplast. They should ordinarily be mixed in proportions wherein they show mutual compatibility unless unusual, special effects, such as delustring, are desired, in which event incomplete compatibility may be the means by which the effect is attained.

Any suitable concentration of the polymer, polyepoxide, and aminoplast in the solvent may be employed such as from 1 to 50% by weight. If a pigment is present, the total solids concentration in the coating composition may be from 5 to 75% by weight. The ratio of pigment to binder (using the latter term to embrace the polymer, polyepoxide, and the aminoplast condensate) may be from 1:20 to 20:1.

The solvents that may be employed include such hydrocarbons as benzene, toluene, xylenes, and aromatic naphthas or mixtures of such solvents; esters such as ethyl, butyl, amyl, ethoxyethyl, or methoxyethyl acetates, lactates, or propionates; ketones such as acetone, methyl isopropyl ketone, methyl isobutyl ketone, dioxane, isophorone, and cyclohexanone; alcohols such as n-butanol, t-butanol, isopropyl alcohol, n-propyl alcohol, amyl alcohols, and cyclohexanol; ethers such as diethyl ether, the monoethyl ether of ethylene glycol, the monomethyl ether of ethylene glycol, and the monobutyl ether of ethylene glycol; and miscellaneous solvents including dimethyl formamide, dimethylacetamide, acetonitrile, nitromethane, nitroethane, nitropropane, and nitrobutane; as well as mixtures of two or more solvent materials either from the same group or any or all of the groups just listed.

Pigments suitable for use according to the invention are inorganic pigments such as, for example, chrome yellows, Prussian blues and Brunswick greens, titanium pigments such as titanium dioxide, extended titanium pigments (extended with either precipitated or natural extenders, such as alkali earth sulphate for instance barium sulphate and the like), tinted titanium pigments, titanates such as barium, zinc, lead, magnesium titanates, and the like. Additionally, other types of inorganic pigments might be included, such as zinc sulfide pigments, for instance, zinc sulfide, lithopone, other extended zinc sulfide pigments, such as calcium base lithopone, zinc sulfide extended with natural extenders and the like, zinc oxide and antimony oxide, or organic pigments, that is organic coloring matters which are devoid of sulphonic, carboxylic, or other water-solubilizing groups. Also, for the purposes of this invention, we include within the term "pigment" other water-insoluble organic coloring matters such as, for example, the calcium or barium lakes of azo lake dyestuffs.

The compositions of the present invention are adapted to be applied in any suitable fashion to the substrate to be coated such as by brushing, spraying, dipping, roller coating, or the like, then dried and finally cured by baking.

The compositions herein may be applied for the coating of a wide variety of substrates including paper, textiles, leather, wood, ceramics, brick, stone, and concrete surfaces, as well as metals. Thus, they may be used as finishing topcoats for automobiles or for the decoration of metals in general, such as tin cans or other cannisters. They are particularly suitable for the coating of asbestos cement products where curing in an autoclave in direct contact with steam is encountered.

As stated above, the compositions, after application to the substrates to be coated, are dried and cured. Such drying and curing may be carried out simply at room temperatures. However, drying may be effected at elevated temperatures such as at 140° F. up to 220° F. and baking may be effected at temperatures anywhere from 180° to 450° F. As is obvious from the preceding statement, drying and curing may be considered as part of one operation, the curing following the drying immediately. The time of curing may vary from a period as short as one-half to two minutes at the upper range of temperature around 450° F. up to one hour or two at the lower portion of the temperature range given, namely 180° F. A particularly practical curing operation is effected at 300° F. for a period of 15 to 30 minutes or so. As stated previously, the coatings also can be satisfactorily cured in a steam atmosphere in direct contact with the steam (at pressures from atmospheric to 100 lbs./sq. in. gage or higher).

The examples immediately following illustrate the preparation of several aminoplast type condensates, but it is to be understood that the preparation of such condensates is not in itself a part of the present invention since conventionally-available alkylated aminoplast condensates can be employed. The following resins designated A through D are merely typical of alkylated aminoplast resins that can be employed herewith. In these examples, the parts and percentages are by weight unless otherwise clearly indicated.

EXAMPLE A (RESIN A)

*Preparation of Methoxymethyl Melamine in Butanol*

Charge:                                 Moles
  A. 1070.0 g. flake para-formaldehyde _____ 32.5
  B. 2400.0 g. methanol _____ 75.0
  C. 630.0 g. melamine _____ 5.0
  D. 5.0 ml. 50% formic acid.
  E. 620.0 g. n-butanol for dilution.

Materials A, B, C, and D were charged to a glass reaction vessel equipped with thermometer, mechanical stirrer and reflux condenser. The mixture was heated to reflux and held at reflux temperature for about 3½ hours. At the end of this time, the heat was shut off and the pH of the system adjusted to 9 to 10 with triethylamine (about 12.0 grams required).

The reaction mixture was then stripped under reduced pressure (about 20 to 30 mm. Hg) to about 82 to 85% solids (about 2,400 grams of solvent was distilled off), then cut back to about 60% solids with butanol "E." Yield: 2,320 grams of product at 61.6% solids, viscosity 2.5 poises. The product was filtered through Super-Cel.

EXAMPLE B (RESIN B)

126 parts of melamine and 405.5 parts of formalin (a 37% aqueous solution of formaldehyde) and 440 parts of n-butanol are introduced into a suitable reaction chamber equipped with thermometer, stirrer, reflux condenser, and a suitable water trap through which the ruflux condensate passes on its return to the reaction chamber and in which the essentially aqueous fraction of the condensate may be separated from the essentially non-aqueous fraction. Means are provided so that the former fraction may be drawn off if desirable. The reaction mixture is refluxed to a temperature of about 91° to 93° C. at atmospheric pressure for 6 to 8 hours. The water is removed by azeotropic distillation from the reaction mixture during the reflux operation. The vapor temperature will be about 100° to 105° C. The pressure is lowered sufficiently to reduce the vapor temperature to about 85° to 90° C. and the resin solution is concentrated to about 50% solids by vacuum distillation.

EXAMPLE C (RESIN C)

3370 parts of a 37% aqueous formaldehyde solution are charged into a suitable reaction chamber and neutralized to a pH of 8.6 with 20% sodium hydroxide and there is then added 6 parts of an 85% phosphoric acid solution. The mixture is heated to 70° C. and 1200 parts of urea are added over a one hour period. The mixture is then heated to 85° C. and held at that temperature for approximately one hour. 1340 parts of butanol are added and the mixture is heated to reflux and held at that temperature for approximately one hour. 1550 additional parts of butanol are added and the mixture distilled, while replacing distillate with a feed of dry butanol, until the batch temperature reaches about 112° C. The batch is then vacuum concentrated at 90° C. to approximately 65% resin solids. This solution is diluted with xylene and butanol to give a final composition of 20% xylene, 30% butanol, and 50% resin solids.

EXAMPLE D (RESIN D)

1554 parts of a 37% aqueous formaldehyde solution with a pH adjusted to about 8 with sodium hydroxide is introduced into a suitable reaction chamber. Thereafter, 654 parts of benzoguanamine, 3 parts of magnesium carbonate, 657 parts of n-butanol, and 370 parts of xylene are introduced. The reaction is heated under reflux decantation until 700 parts of water are drawn off. Seven parts of phthalic acid are then added and the heating under decantation is continued until practically all of the water (1300 parts) has been removed. The reaction mass is then cooled to about 70° to 80° C. and then filtered. The yield is about 2010 parts of resin solution containing about 60% solids.

The epoxide resins referred to in the following examples are the following:

Epoxide A is a reaction product of glycerine and epichlorohydrin having the following characteristics: an epoxy equivalent (grams of resin containing 1 g.-equivalent of epoxide) of about 150, an equivalent weight of about 60 (grams of resin required to esterify 1 g.-mole of acetic acid), a viscosity at 25° C. of about 1.25 poises at 100% solids, soluble in water, methanol, acetone, benzene, and toluene;

Epoxide B is a condensation product of ethylene glycol and epichlorohydrin having the following characteristics: an epoxy equivalent of about 200, an equivalent weight of about 80, a viscosity of about 100 poises (100% solids at 25° C.), soluble in methanol, acetone, benzene, and toluene;

Epoxide C is a condensation product of epichlorohydrin with 4,4'-isopropylidene-bisphenol (commonly called Bisphenol A) having the following characteristics: an epoxy equivalent of about 500, an equivalent weight of about 130, melting point range 64° to 76° C., a viscosity of about 1.5 poises at 25% C., and 40% in the monobutyl ether of diethylene glycol, soluble in toluene, xylene;

Epoxide D is a condensation product of epichlorohydrin and a mixture of ethylene glycol and diethylene glycol having the following characteristics: an epoxy equivalent of about 175, an equivalent weight of about 75, a viscosity at 25° C. of about 148 poises, soluble in xylene and toluene.

Epoxide E is a solid (M.P. 90–110° C.) condensation product of epichlorohydrin with 4,4'-isopropylidene-bisphenol (commonly called Bisphenol A) having the following characteristics: an epoxy equivalent of about 875 to 1025 and an equivalent weight of about 180.8.

The following examples in which all parts and percentages are by weight unless otherwise indicated are illustrative of the invention.

Example 1

(a) A solution (1700 parts) in toluene containing 40% of a copolymer of about 67.5% of methyl methacrylate, 30% ethyl acrylate, and 2.5% of N-(β-(α-methacryloxy-acetamido)ethyl)-N,N'-ethyleneurea, is mixed with 575 parts of a 40% solution in the monobutyl ether of diethylene glycol of Epoxide C and 150 parts of the 60% solution of n-butylated benzoguanamine/formaldehyde of Example D. Then 5 parts of the morpholine salt of p-toluene-sulfonic acid is added.

(b) A sheet of asbestos-cement composition was prepared on a conventional cylinder-type forming machine. The wet sheet was 5/32 of an inch in thickness and was made up of several laminations and a veneer of approximately 0.015 inch thickness. The base contained on a solids-basis: 80% Portland cement, and 20% asbestos fiber. The veneer contained on a solids-basis: 60% Portland cement, 18% asbestos fibers, and 22% mineral oxide pigments and extenders. The composite sheet containing approximately 20% moisture content was run under a bank of radiant heaters which reduced the moisture-content to about 18%. The sheet was then textured by means of embossing rolls after which it was sprayed while at about 140° F. with the solution of part (a).

The spraying equipment was adjusted to the speed of the machine so that the amount of dispersion applied was such as to deposit about 2 to 3 grams of resin solids, on a dry basis, per square foot of the asbestos-cement sheet. The coated sheets were passed through a short drying section during which time the moisture content of the resin film was reduced and a substantial portion of the organic solvent was also removed leaving a continuous tack-free film of the resin solids on the sheets. The sheet was then cut into individual sections or units measuring 2 ft. by 4 ft. and these were immediately stacked to a height of two to three feet on wooden pallets. At this stage, the sheets were soft and could be deformed or ruptured by ordinary pinching with thumb and finger. They were not rigid but were so plastic that they conformed to the shape of a surface on which they were placed. The units were piled one on another and were stored in a warehouse at ambient temperature for three days. The individual sheets were then removed from the pallets, were punched and trimmed to final dimensions, and were packaged. In no instance was there evidence of blocking. That is, the sheets which had been coated and stacked in the plastic condition gave no evidence of adhesion, one to another.

Example 2

The procedure of Example 1 is repeated except that the cut units were piled one on another and instead of being stored in a warehouse at ambient temperature for three days, the piled units were introduced into an autoclave wherein they were heated to about 170° C. for a period of eight hours. During the autoclaving, the solvent was substantially completely removed. On removal from the autoclave, it was found that the sheets did not block together and the asbestos-cement units carried uniform, clear, glossy films of the polymer.

Example 3

(a) A solution (1750 parts) in toluene containing 40% of a copolymer of about 67.5% of methyl methacrylate, 30% ethyl acrylate, and 2.5% of N-(β-(α-methacryloxy-acetamido)ethyl)-N,N'-ethyleneurea, is mixed with 500 parts of a 40% solution in the monobutyl ether of diethylene glycol of Epoxide C and 167 parts of the 60% solution of n-butylated benzoguanamine/formaldehyde of Example D. Then 5 parts of the morpholine salt of p-toluenesulfonic acid is added.

(b) The procedure of Example 2 is repeated using the solution of part (a) hereof for coating the asbestos cement sheet.

Example 4

(a) A solution (2000 parts) in toluene containing 40% of a copolymer of about 67.5% of methyl methacrylate, 30% ethyl acrylate, and 2.5% of N-(β-(α-methacryloxy-acetamido)ethyl)-N,N'-ethyleneurea, is mixed with 250 parts of a 40% solution in the monobutyl ether of diethylene glycol of Epoxide C and 166.7 parts of the 60% solution of n-butylated benzoguanamine/formaldehyde of Example D. Then 5 parts of the morpholine salt of p-toluenesulfonic acid is added.

(b) The procedure of Example 2 is repeated using the solution of part (a) hereof for coating the asbestos cement sheet.

The cement products obtained in accordance with the present invention have attractive sheen and appearance. The coated products retain their attractive appearance over long periods of time and show no efflorescence, no discoloration in spite of the usual exposure to the rays of the sun, and are free from deterioration by hydrolytic action.

*Example 5*

Bare panels of aluminum and chromium are separately coated with each of the compositions of parts (a) of Examples 1, 2, and 3. On air-drying and curing at a temperature of 300° F. for 30 minutes, clear, glossy coatings are obtained which show good adhesion to the metals.

*Example 6*

(a) Films of about four mils thickness were cast on mercury with a composition like that of Example 3(a), except that the copolymer there used is replaced with a copolymer of methyl methacrylate, and about 1% of N-(β - (α - methacryloxyacetamido)ethyl) - N,N' - ethyleneurea. The films are dried and heated at 150° F. for 5 minutes and other films were baked at 300° F. for 5 minutes. On testing, the films (heated 5 minutes at 150° F.) showed a dielectric strength of 1241 volts per mil. The films (heated 5 minutes at 150° F. and apparently in uncured condition) have the remarkably low value of 4.19 for the "percent power factor" at 23° C. and 50 volts per mil. These films have an insulation resistivity (at 500 volts) of $7.0 \times 10^5$ megohms whereas the films cured 5 minutes at 300° F. have a resistivity of $7.5 \times 10^6$ megohms.

(b) Films prepared from the compositions of Examples 1(a) and 4(a) show the values in the following table:

| Example | Temp. of Heating, °F. | Dielectric Strength, Volts per mil | Percent Power Factor at 23° C., 50 v./m. | Ins. Resis. (500 v.) megohms |
|---|---|---|---|---|
| 1(a) | 150 | 1,095 | 3.60 | $4.0 \times 10^5$ |
| 1(a) | 300 | | | $4.0 \times 10^6$ |
| 4(a) | 150 | 1,216 | 3.47 | $4.5 \times 10^5$ |
| 4(a) | 300 | | | $9.0 \times 10^6$ |

*Example 7*

A coating composition is prepared by mixing 1000 parts of a solution in a 1:1 weight ratio mixture of the monomethyl ether of diethylene glycol and dimethylformamide containing 40% of a copolymer of 85% methyl methacrylate, 10% of ethyl acrylate, and 5% of acrylamide with 1000 parts of Prussian blue on a three-roll mill. Then 600 additional parts of the same copolymer solution is mixed in. To this mixture there is added 600 parts of a 40% solution of Epoxide A in toluene and 100 parts of the 61.6% solution of Resin A. The solution is then coated on bare panels of aluminum, chromeplated steel, and cold-rolled steel. After air-drying and baking at 325° F. for 25 minutes, the panels are cooled.

*Example 8*

The procedure of Example 7 is repeated replacing the aminoplast with a corresponding amount of Resin B with similar results.

In the same manner coated panels are prepared from compositions as in Example 7 in which the polyepoxide is replaced in successive runs with Epoxides B, C, and D, respectively.

*Example 9*

The procedure of Example 7 is repeated replacing the aminoplast with a corresponding amount of Resin C with similar results.

In the same manner coated panels are prepared from compositions as in Example 7 in which the polyepoxide is replaced in successive runs with Epoxides B, C, and D, respectively.

*Example 10*

The compositions of Examples 1(a), 4(a), and 6(a) are used for impregnating paper and cloth tapes. For this purpose, about 5 parts of paraffin wax may be added to reduce blocking. The impregnated tapes may be dried at temperatures from room temperature up to 150° F. to 170° F. for about 5 minutes, applied thereafter to articles to be protected thereby, and, if desired, then finally cured by heating 5 minutes or more at 300° F. to 350° F. The articles may be of such large size that the conventional hot-air ovens can only provide surface curing. However, curing can be effected in depth by means of a steam autoclave using 75 to 125 lbs./sq. inch gage pressure or higher to provide temperatures of 300° to 350° F. The solvent can be recovered from the exhaust steam.

*Example 11*

A sheet of onion-skin paper is impregnated with a solution of the same composition as that of Example 3(a) except that the epoxide used was Epoxide E. The impregnated sheet is dried 5 minutes at 150° F. The sheet is transparentized by this treatment. It is capable of being sealed or cemented to such other materials as paper by application of heat and pressure. Thus, a small section cut from the sheet is applied to the opening in the face of an envelope blank and sealed thereto by application of a heated die (about 350° F.) along the overlapped border of the transparent section around the window.

*Example 12*

Castings of iron, steel, bronze, brass, aluminum, and alloys thereof are warmed to 130° F. and dipped in the compositions of Examples 1(a), 3(a), 4(a), and 6(a), diluted with the monomethyl ether of diethylene glycol to 25% solids. The pores of the castings are thus filled with the compositions. The impregnated castings are dried and cured in an autoclave with steam at 110 lbs./sq. in. gage pressure. The surfaces are machinable, have high resistance to heat, are resistant to cutting oils, and provide excellent wear surfaces, before and after machining. This operation eliminates porosity faults and makes it possible to use castings in many situations where forgings have heretofore been used.

*Example 13*

Ceramic insulator bodies of porous structure (unglazed) are warmed to 140° F. and saturated with 25% solutions of the compositions of Examples 1(a), 3(a), 4(a), and 6(a). The articles are dried and cured as in Example 12. The products have an advantage over glazed products in that if the surface is chipped or cracked, the insulation effectiveness is not lost as would be the case of glazed insulators.

It is to be understood that changes and variations may be made without departing from the spirit and scope of the invention as defined in the appended claims.

I claim:

1. As an article of manufacture, a solid substrate having a coating adhered thereon comprising the heat-cured product of a compatible mixture of (A) 45 to 90% by weight of a thermoplastic copolymer of copolymerizable monoethylenically unsaturated molecules comprising a compound of the formula

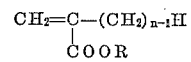

wherein $n$ is an integer having a value of 1 to 2, and R is selected from the group consisting of benzyl, cyclohexyl, and alkyl groups having 1 to 10 carbon atoms, and 1 to 10% by weight of a copolymerizable monoethylenically unsaturated compound having a $H_2C=C<$ group and an amido group, (B) 5 to 25% by weight of a thermosetting alcohol-modified aminoplast resin condensate selected from the group consisting of a condensation product of formaldehyde with urea, N,N'-ethyleneurea, dicyandiamide, and aminotriazines alkylated by an alcohol selected from the group consisting of cyclohexanol and alkanols having 1 to 8 carbon atoms, and (C) 5 to 30% by weight of a resin-forming polyether containing a plurality of vic-epoxide groups attached to a chain of atoms consisting of carbon and ether oxygen and having an epoxy equivalency of about 100 to 1025, said polyether being selected from the group consisting of (1) glycol-bis-exo-dihydrodicyclopentadienyl ethers of the formula $$O'=C_{10}H_{13}-O-R-O-C_{10}H_{13}=O'$$

in which $C_{10}H_{13}$ is the radical of exo-dihydrodicyclopentadiene, the two O' atoms each forming a vic-epoxy group, and R is selected from the group consisting of an alkylene group of 2 to 12 carbon atoms, and a radical of the formula $(R'-O-)_xR'$ in which R' is an alkylene group of 2 to 4 carbon atoms and x is an integer having a value of 1 to 8, and (2) condensation products of a member selected from the group consisting of a polyhydric phenol and a saturated polyhydric alcohol having 2 to 4 carbon atoms with an epihalohydrin.

2. An article of claim 1 in which the substrate is a solid metal.

3. An article of claim 1 in which the substrate is an inorganic cement article.

4. An article of claim 1 in which the substrate is of aluminum.

5. An article of claim 1 in which the substrate is a chrome-plated article.

6. As an article of manufacture, a solid substrate having a coating adhered thereon comprising the heat-cured product of a compatible mixture of (A) 45 to 90% by weight of a thermoplastic copolymer of a mixture of copolymerizable monoethylenically unsaturated molecules comprising a compound of the formula $$CH_2=C-(CH_2)_{n-1}H$$
$$|$$
$$COOR$$

wherein n is an integer having a value of 1 to 2, and R is selected from the group consisting of benzyl, cyclohexyl, and alkyl groups having 1 to 10 carbon atoms, and 1 to 10% by weight of a copolymerizable amide selected from the group consisting of acrylamide, methacrylamide, N-alkylacrylamides, and N-alkylmethacrylamides in which the alkyl group has 1 to 4 carbon atoms, N-(β-(α-acryloxyacetamido)ethyl)-N,N'-ethyleneurea, and N-(β-(α-methacryloxyacetamido)ethyl)-N,N'-ethyleneurea, (B) 5 to 25% by weight of a thermosetting alcohol-modified aminoplast resin condensate selected from the group consisting of a condensation product of formaldehyde with urea, N,N'-ethyleneurea, dicyandiamide, and aminotriazines alkylated by an alcohol selected from the group consisting of cyclohexanol and alkanols having 1 to 8 carbon atoms, and (C) 5% to 30% by weight of a resin-forming polyether containing a plurality of vic-epoxide groups attached to a chain of atoms consisting of carbon and ether oxygen and having an epoxy equivalency of about 100 to 1025, said polyether being selected from the group consisting of (1) glycol-bis-exo-dihydrodicyclopentadienyl ethers of the formula $$O'=C_{10}H_{13}-O-R-O-C_{10}H_{13}=O'$$

in which $C_{10}H_{13}$ is the radical of exo-dihydrodicyclopentadiene, the two O' atoms each forming a vic-epoxy group, and R is selected from the group consisting of an alkylene group of 2 to 12 carbon atoms, and a radical of the formula $(R'-O-)_xR'$ in which R' is an alkylene group of 2 to 4 carbon atoms and x is an integer having a value of 1 to 8, and (2) condensation products of a member selected from the group consisting of a polyhydric phenol and a saturated polyhydric alcohol having 2 to 4 carbon atoms with an epihalohydrin.

7. As an article of manufacture, a solid substrate having a coating adhered thereon comprising the heat-cured product of a compatible mixture of (A) 65 to 82% by weight of a thermoplastic copolymer of a mixture of copolymerizable monoethylenically unsaturated molecules comprising a compound of the formula $$CH_2=C-(CH_2)_{n-1}H$$
$$|$$
$$COOR$$

wherein n is an integer having a value of 1 to 2, R is selected from the group consisting of benzyl, cyclohexyl, and alkyl groups having 1 to 10 carbon atoms and 1 to 10% by weight of a copolymerizable monoethylenically unsaturated compound having a $H_2C=C<$ group and an amido group, and 1 to 4% by weight of a copolymerizable monoethylenically α,β-unsaturated acid, (B) 8 to 12% by weight of a thermosetting alcohol-modified aminoplast resin condensate selected from the group consisting of a condensation product of formaldehyde with urea, N,N'-ethyleneurea, dicyandiamide, and aminotriazines alkylated by an alcohol selected from the group consisting of cyclohexanol and alkanols having 1 to 8 carbon atoms, and (C) 10 to 23% by weight of a resin-forming polyether containing a plurality of vic-epoxide groups attached to a chain of atoms consisting of carbon and ether oxygen and having an epoxy equivalency of about 100 to 1025, said polyether being selected from the group consisting of (1) glycol-bis-exo-dihydrodicyclopentadienyl ethers of the formula $$O'=C_{10}H_{13}-O-R-O-C_{10}H_{13}=O'$$

in which $C_{10}H_{13}$ is the radical of exo-dihydrodicyclopentadiene, the two O' atoms each forming a vic-epoxy group, and R is selected from the group consisting of an alkylene group of 2 to 12 carbon atoms, and a radical of the formula $(R'-O-)_xR'$ in which R' is an alkylene group of 2 to 4 carbon atoms and x is an integer having a value of 1 to 8, and (2) condensation products of a member selected from the group consisting of a polyhydric phenol and a saturated polyhydric alcohol having 2 to 4 carbon atoms with an epihalohydrin.

8. As an article of manufacture, a solid substrate having a coating adhered thereon comprising the heat-cured product of a compatible mixture of (A) 45 to 90% by weight of a thermoplastic copolymer of a mixture of a compound of the formula $$CH_2=C-(CH_2)_{n-1}H$$
$$|$$
$$COOR$$

wherein n is an integer having a value of 1 to 2, and R is selected from the group consisting of benzl, cyclohexyl, and alkyl groups having 1 to 10 carbon atoms and 1 to 10% by weight of a copolymerizable monoethylenically unsaturated compound having a $H_2C=C<$ group and a ureido group, (B) 5 to 25% by weight of a thermosetting alcohol-modified aminoplast resin condensate selected from the group consisting of a condensation product of formaldehyde with urea, N,N'-ethyleneurea, dicyandiamide, and aminotriazines alkylated by an alcohol selected from the group consisting of cyclohexanol and alkanols having 1 to 8 carbon atoms, and (C) 5 to 30% by weight of a resin-forming polyether containing a plurality of vic-epoxide groups attached to a chain of atoms consisting of carbon and ether oxygen and having an epoxy equivalency of about 100 to 1025, said polyether being selected from the group consisting of
(1) glycol-bis-exo-dihydrodicyclopentadienyl ethers of the formula $$O'=C_{10}H_{13}-O-R-O-C_{10}H_{13}=O'$$

in which $C_{10}H_{13}$ is the radical of exo-dihydrodicyclopentadiene, the two O' atoms each forming a vic-epoxy group, and R is selected from the group consisting of an alkylene group of 2 to 12 carbon atoms, and a radical of the formula $(R'-O-)_xR'$ in which R' is an alkylene group of 2 to 4 carbon atoms and $x$ is an integer having a value of 1 to 8, and
(2) condensation products of a member selected from the group consisting of a polyhydric phenol and a saturated polyhydric alcohol having 2 to 4 carbon atoms with an epihalohydrin.

9. An article of claim 8 in which the copolymerizable compound is N - ($\beta$ - ($\alpha$-methacryloxyacetamido)ethyl)-N,N'-ethyleneurea.

10. As an article of manufacture, a solid substrate having a coating adhered thereon comprising the heat-cured product of a compatible mixture of (A) 45 to 90% by weight of a thermoplastic copolymer of a mixture of a compound of the formula $$CH_2=C-(CH_2)_{n-1}H$$
$$|$$
$$COOR$$

wherein $n$ is an integer having a value of 1 to 2, and R is selected from the group consisting of benzyl, cyclohexyl, and alkyl groups having 1 to 10 carbon atoms and 1 to 10% by weight of an amide of an acid of the formula $$H_2C=C-(CH_2)_{n-1}-H$$
$$|$$
$$COOH$$

wherein $n$ is an integer having a value of 1 to 2, (B) 5 to 25% by weight of a thermosetting alcohol-modified aminoplast resin condensate selected from the group consisting of a condensation product of formaldehyde with urea, N,N'-ethyleneurea, dicyandiamide, and aminotriazines alkylated by an alcohol selected from the group consisting of cyclohexanol and alkanols havings 1 to 8 carbon atoms, and (C) 5 to 30% by weight of a resin-forming polyether containing a plurality of vic-epoxide groups attached to a chain of atoms consisting of carbon and ether oxygen and having an epoxy equivalency of about 100 to 1025, said polyether being selected from the group consisting of
(1) glycol-bis-exo-dihydrodicyclopentadienyl ethers of the formula $$O'=C_{10}H_{13}-O-R-O-C_{10}H_{13}=O'$$

in which $C_{10}H_{13}$ is the radical of exo-dihydrodicyclopentadiene, the two O' atoms each forming a vic-epoxy group, and R is selected from the group consisting of an alkylene group of 2 to 12 carbon atoms, and a radical of the formula $(R'-O-)_xR'$ in which R' is an alkylene group of 2 to 4 carbon atoms and $x$ is an integer having a value of 1 to 8, and
(2) condensation products of a member selected from the group consisting of a polyhydric phenol and a saturated polyhydric alcohol having 2 to 4 carbon atoms with an epihalohydrin.

11. A composition comprising a compatible mixture of (A) 45 to 90% by weight of a thermoplastic copolymer of copolymerizable monoethylenically unsaturated molecules comprising a compound of the formula $$CH_2=C-(CH_2)_{n-1}H$$
$$|$$
$$COOR$$

wherein $n$ is an integer having a value of 1 to 2, and R is selected from the group consisting of benzyl, cyclohexyl, and alkyl groups having 1 to 10 carbon atoms, and 1 to 10% by weight of a copolymerizable monoethylenically unsaturated compound having a $H_2C=C<$ group and an amido group, (B) 5 to 25% by weight of a thermosetting alcohol-modified aminoplast resin condensate selected from the group consisting of a condensation product of formaldehyde with urea, N,N'-ethyleneurea, dicyandiamide, and aminotriazines alkylated by an alcohol selected from the group consisting of cyclohexanol and alkanols having 1 to 8 carbon atoms, and (C) 5 to 30% by weight of a resin-forming polyether containing a plurality of vic-epoxide groups attached to a chain of atoms consisting of carbon and ether oxygen and having an epoxy equivalency of about 100 to 1025, said polyether being selected from the group consisting of
(1) glycol-bis-exo-dihydrodicyclopentadienyl ethers of the formula $$O'=C_{10}H_{13}-O-R-O-C_{10}H_{13}=O'$$

in which $C_{10}H_{13}$ is the radical of exo-dihydrodicyclopentadiene, the two O' atoms each forming a vic-epoxy group, and R is selected from the group consisting of an alkylene group of 2 to 12 carbon atoms, and a radical of the formula $(R'-O-)_xR'$ in which R' is an alkylene group of 2 to 4 carbon atoms and $x$ is an integer having a value of 1 to 8, and
(2) condensation products of a member selected from the group consisting of a polyhydric phenol and a saturated polyhydric alcohol having 2 to 4 carbon atoms with an epihalohydrin.

12. A composition suitable for coating purposes comprising a solution in an organic solvent of 1 to 50% by weight of a compatible mixture of (A) 45 to 90% by weight of a thermoplastic polymer of a compound of the formula $$CH_2=C-(CH_2)_{n-1}H$$
$$|$$
$$COOR$$

wherein $n$ is an integer having a value of 1 to 2, R is selected from the group consisting of benzyl, cyclohexyl, and alkyl groups having 1 to 10 carbon atoms, and 1 to 10% by weight of a copolymerizable amide selected from the group consisting of acrylamide, methacrylamide, N-alkylacrylamides, and N-alkylmethacrylamides in which the alkyl group has 1 to 4 carbon atoms, N-($\beta$-($\alpha$-acryloxyacetamido)ethyl)-N,N'-ethyleneurea, and N-($\beta$-($\alpha$-methacryloxyacetamido)ethyl)-N,N'-ethyleneurea (B) 5 to 25% by weight of a thermosetting alcohol-modified aminoplast resin condensate selected from the group consisting of a condensation product of formaldehyde with urea, N,N'-ethyleneurea, dicyandiamide, and aminotriazines alkylated by an alcohol selected from the group consisting of cyclohexanol and alkanols having 1 to 8 carbon atoms, and (C) 5 to 30% by weight of a resin-forming polyether containing a plurality of vic-epoxide groups attached to a chain of atoms consisting of carbon and ether oxygen and having an epoxy equivalency of about 100 to 1025, said polyether being selected from the group consisting of
(1) glycol-bis-exo-dihydrodicyclopentadienyl ethers of the formula $$O'=C_{10}H_{13}-O-R-O-C_{10}H_{13}=O'$$

in which $C_{10}H_{13}$ is the radical of exo-dihydrodicyclopentadiene, the two O' atoms each forming a vic-epoxy group, and R is selected from the group consisting of an alkylene group of 2 to 12 carbon atoms, and a radical of the formula $(R'-O-)_xR'$ in which R' is an alkylene group of 2 to 4 carbon atoms and $x$ is an integer having a value of 1 to 8, and
(2) condensation products of a member selected from the group consisting of a polyhydric phenol and a saturated polyhydric alcohol having 2 to 4 carbon atoms with an epihalohydrin.

13. A composition comprising a compatible mixture of (A) 45 to 90% by weight of a thermoplastic copolymer of a mixture of copolymerizable monoethylenically unsaturated molecules comprising a compound of the formula

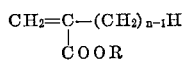

wherein $n$ is an integer having a value of 1 to 2, R is selected from the group consisting of benzyl, cyclohexyl, and alkyl groups having 1 to 10 carbon atoms, and 1 to 10% by weight of acrylamide, and (B) 5 to 25% by weight of a thermosetting alcohol-modified anioplast resin condensate selected from the group consisting of a condensation product of formaldehyde with urea, N,N'-ethyleneurea, dicyandiamide, and aminotriazines alkylated by an alcohol selected from the group consisting of cyclohexanol and alkanols having 1 to 8 carbon atoms, and (C) 5% to 30% by weight of a resin-forming polyether containing a plurality of vic-epoxide groups attached to a chain of atoms consisting of carbon and ether oxygen and having an epoxy equivalency of about 100 to 1025, said polyether being selected from the group consisting of
  (1) glycol-bis-exo-dihydrodicyclopentadienyl ethers of the formula

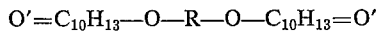

in which $C_{10}H_{13}$ is the radical of exo-dihydrodicyclopentadiene, the two O' atoms each forming a vic-epoxy group, and R is selected from the group consisting of an alkylene group of 2 to 12 carbon atoms, and a radical of the formula $(R'-O-)_xR'$ in which R' is an alkylene group of 2 to 4 carbon atoms and $x$ is an integer having a value of 1 to 8, and
  (2) condensation products of a member selected from the group consisting of a polyhydric phenol and a saturated polyhydric alcohol having 2 to 4 carbon atoms with an epihalohydrin.

14. A composition comprising a compatible mixture of (A) 65 to 82% by weight of a thermoplastic copolymer of a mixture of copolymerizable monoethylenically unsaturated molecules comprising a compound of the formula

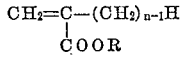

wherein $n$ is an integer having a value of 1 to 2, R is selected from the group consisting of benzyl, cyclohexyl, and alkyl groups having 1 to 10 carbon atoms and 1 to 4% by weight of a copolymerizable monoethylenically $\alpha,\beta$-unsaturated acid, and 1 to 10% by weight of a copolymerizable monoethylenically unsaturated compound having a $H_2C=C<$ group and an amido group, (B) 8 to 12% by weight of a thermosetting alcohol-modified aminoplast resin condensate selected from the group consisting of a condensation product of formaldehyde with urea, N,N'-ethyleneurea, dicyandiamide, and aminotriazines alkylated by an alcohol selected from the group consisting of cyclohexanol and alkanols having 1 to 8 carbon atoms, and (C) 10 to 23% by weight of a resin-forming polyether containing a plurality of vic-epoxide groups attached to a chain of atoms consisting of carbon and ether oxygen and having an epoxy equivalency of about 100 to 1025, said polyether being selected from the group consisting of
  (1) glycol-bis-dihydrodicyclopentadienyl ethers of the formula

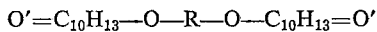

in which $C_{10}H_{13}$ is the radical of exo-dihydrodicyclopentadiene, the two O' atoms each forming a vic-epoxy group, and R is selected from the group consisting of an alkylene group of 2 to 12 carbon atoms, and a radical of the formula $(R'-O-)_xR'$ in which R' is an alkylene group of 2 to 4 carbon atoms and $x$ is an integer having a value of 1 to 8, and
  (2) condensation products of a member selected from the group consisting of a polyhydric phenol and a saturated polyhydric alcohol having 2 to 4 carbon atoms with an epihalohydrin.

15. A composition comprising a compatible mixture of (A) 45 to 90% by weight of a thermoplastic copolymer of a mixture of a compound of the formula

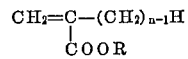

wherein $n$ is an integer having a value of 1 to 2, R is selected from the group consisting of benzyl, cyclohexyl, and alkyl groups having 1 to 10 carbon atoms and 1 to 10% by weight of a copolymerizable monoethylenically unsaturated compound having a $H_2C=C<$ group and a ureido group, (B) 5 to 25% by weight of a thermosetting alcohol-modified aminoplast resin condensate selected from the group consisting of a condensation product of formaldehyde with urea, N,N'-ethyleneurea, dicyandiamide, and aminotriazines alkylated by an alcohol selected from the group consisting of cyclohexanol and alkanols having 1 to 8 carbon atoms, and (C) 5 to 30% by weight of a resin-forming polyether containing a plurality of vic-epoxide groups attached to a chain of atoms consisting of carbon and ether oxygen and having an epoxy equivalency of about 100 to 1025, said polyether being selected from the group consisting of
  (1) glycol-bis-exo-dihydrodicyclopentadienyl ethers of the formula

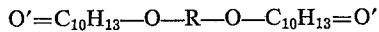

in which $C_{10}H_{13}$ is the radical of exo-dihydrodicyclopentadiene, the two O' atoms each forming a vic-epoxy group, and R is selected from the group consisting of an alkylene group of 2 to 12 carbon atoms, and a radical of the formula $(R'-O-)_xR'$ in which R' is an alkylene group of 2 to 4 carbon atoms and $x$ is an integer having a value of 1 to 8, and
  (2) condensation products of a member selected from the group consisting of a polyhydric phenol and a saturated polyhydric alcohol having 2 to 4 carbon atoms with an epihalohydrin.

16. A composition comprising a compatible mixture of (A) 45 to 90% by weight of a thermoplastic copolymer of a mixture of a compound of the formula

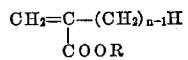

wherein $n$ is an integer having a value of 1 to 2, R is selected from the group consisting of benzyl, cyclohexyl, and alkyl groups having 1 to 10 carbon atoms and 1 to 10% by weight of N-($\beta$-($\alpha$-methacryloxyacetamido)ethyl)-N,N'-ethyleneurea, (B) 5 to 25% by weight of a thermosetting alcohol-modified aminoplast resin condensate selected from the group consisting of a condensation product of formaldehyde with urea, N,N'-ethyleneurea, dicyandiamide, and aminotriazines alkylated by an alcohol selected from the group consisting of cyclohexanol and alkanols having 1 to 8 carbon atoms, and (C) 5 to 30% by weight of a resin-forming polyether containing a plurality of vic-epoxide groups attached to a chain of atoms consisting of carbon and ether oxygen and having an epoxy equivalency of about 100 to 1025, said polyether being selected from the group consisting of
  (1) glycol-bis-exo-dihydrodicyclopentadienyl ethers of the formula

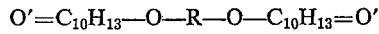

in which $C_{10}H_{13}$ is the radical of exo-dihydrodicyclopentadiene, the two O' atoms each forming a vic-epoxy group, and R is selected from the group consisting of an alkylene group of 2 to 12 carbon atoms, and a radical of the formula $(R'-O-)_xR'$ in which R' is an alkylene group of 2 to 4 carbon atoms and $x$ is an integer having a value of 1 to 8, and (2) condensation products of a member selected from the group consisting of a polyhydric phenol and a saturated polyhydric alcohol having 2 to 4 carbon atoms with an epihalohydrin.

17. A composition comprising a compatible mixture of (A) 45 to 90% by weight of a thermoplastic copolymer of a mixture of a compound of the formula $$CH_2=C-(CH_2)_{n-1}H$$
$$|$$
$$COOR$$

wherein $n$ is an integer having a value of 1 to 2, R is selected from the group consisting of benzyl, cyclohexyl, and alkyl groups having 1 to 10 carbon atoms and 1 to 10% by weight of an amide of an acid of the formula $$H_2C=C-(CH_2)_{n-1}-H$$
$$|$$
$$COOH$$

wherein $n$ is an integer having a value of 1 to 2, (B) 5 to 25% by weight of a thermosetting alcohol-modified aminoplast resin condensate selected from the group consisting of a condensation product of formaldehyde with urea, N,N'-ethyleneurea, dicyandiamide, and aminotriazines alkylated by an alcohol selected from the group consisting of cyclohexanol and alkanols having 1 to 8 carbon atoms, and (C) 5 to 30% by weight of a resin-forming polyether containing a plurality of vic-epoxide groups attached to a chain of atoms consisting of carbon and ether oxygen and having an epoxy equivalency of about 100 to 1025, said polyether being selected from the group consisting of (1) glycol-bis-exo-dihydrodicyclopentadienyl ethers of the formula $$O'=C_{10}H_{13}-O-R-O-C_{10}H_{13}=O'$$

in which $C_{10}H_{13}$ is the radical of exo-dihydrodicyclopentadiene, the two O' atoms each forming a vic-epoxy group, and R is selected from the group consisting of an alkylene group of 2 to 12 carbon atoms, and a radical of the formula $(R'-O-)_xR'$ in which R' is an alkylene group of 2 to 4 carbon atoms and $x$ is an integer having a value of 1 to 8, and (2) condensation products of a member selected from the group consisting of a polyhydric phenol and a saturated polyhydric alcohol having 2 to 4 carbon atoms with an epihalohydrin.

18. A method of preparing a coated article comprising coating a solid substrate with a composition comprising a compatible mixture of (A) 45 to 90% by weight of a thermoplastic copolymer of copolymerizable monoethylenically unsaturated molecules comprising a compound of the formula $$CH_2=C-(CH_2)_{n-1}H$$
$$|$$
$$COOR$$

wherein $n$ is an integer having a value of 1 to 2, R is selected from the group consisting of benzyl, cyclohexyl, and alkyl groups having 1 to 10 carbon atoms, and 1 to 10% by weight of a copolymerizable monoethylenically unsaturated compound having a $H_2C=C<$ group and an amido group, (B) 5 to 25% by weight of a thermosetting alcohol-modified aminoplast main condensate selected from the group consisting of a condensation product of formaldehyde with urea, N,N'-ethyleneurea, dicyandiamide, and aminotriazines alkylated by an alcohol selected from the group consisting of cyclohexanol and alkanols having 1 to 8 carbon atoms, and (C) 5 to 30% by weight of a resin-forming polyether containing a plurality of vic-epoxide groups attached to a chain of atoms consisting of carbon and ether oxygen and having an epoxy equivalency of about 100 to 1025, said polyether being selected from the group consisting of (1) glycol-bis-exo-dihydrodicyclopentadienyl ethers of the formula $$O'=C_{10}H_{13}-O-R-O-C_{10}H_{13}=O'$$

in which $C_{10}H_{13}$ is the radical of exo-dihydrodicyclopentadiene, the two O' atoms each forming a vic-epoxy group, and R is selected from the group consisting of an alkylene group of 2 to 12 carbon atoms, and a radical of the formula $(R'-O-)_xR'$ in which R' is an alkylene group of 2 to 4 carbon atoms and $x$ is an integer having a value of 1 to 8, and (2) condensation products of a member selected from the group consisting of a polyhydric phenol and a saturated polyhydric alcohol having 2 to 4 carbon atoms with an epihalohydrin, then drying and heating the coating at a temperature of 180° to 450° F. for a period of about a half minute to two hours.

19. A method of claim 18 in which, during the last-mentioned heating step, the coating is subjected to steam.

References Cited in the file of this patent

UNITED STATES PATENTS

| | | |
|---|---|---|
| 2,378,365 | Swain et al. | June 12, 1945 |
| 2,599,817 | Evans et al. | June 10, 1952 |
| 2,681,897 | Frazier et al. | June 22, 1954 |
| 2,703,765 | Osdal | Mar. 8, 1955 |
| 2,947,725 | Cooke | Aug. 2, 1960 |